US000001269H

United States Statutory Invention Registration [19]

[11] Reg. Number: H1269

[43] Published: Dec. 7, 1993

Deason

[54] MULTIPLE ACOUSTO-OPTIC Q-SWITCH

[75] Inventor: Vance A. Deason, Idaho Falls, Id.

[73] Assignee: The United States of America as represented by the Department of Energy, Washington, D.C.

[21] Appl. No.: 772,749

[22] Filed: Oct. 7, 1991

Related U.S. Application Data

[62] Division of Ser. No. 634,625, Dec. 27, 1990, abandoned, which is a division of Ser. No. 418,069, Oct. 6, 1989, Pat. No. 5,026,154.

[51] Int. Cl.[5] ..... H01S 3/117

[52] U.S. Cl. ..... 372/13; 372/10; 372/17

[58] Field of Search ..... 372/13, 17

[56] References Cited

U.S. PATENT DOCUMENTS

| | | | |
|---|---|---|---|
| 3,633,995 | 1/1972 | Lean | 372/13 |
| 3,699,474 | 10/1972 | Landry | 372/17 |
| 4,371,964 | 2/1983 | Podmaniczky et al. | 372/13 |
| 4,845,719 | 7/1989 | Kitahara | 372/13 |

OTHER PUBLICATIONS

Landry; "A Pulsed Ruby Laser with Individually Q-Switched Multiple Cavities"; IEEE J. of Quantrum Electronics; Jun. 1973; vol. QE9, No. 6, pp. 604–606.

*Primary Examiner*—Bernarr E. Gregory

*Attorney, Agent, or Firm*—Bradley W. Smith; John M. Albrecht; William R. Moser

[57] ABSTRACT

An improved dynamic moire interferometer comprised of a lasing medium providing a plurality of beams of coherent light, a multiple q-switch producing multiple trains of 100,000 or more pulses per second, a combining means collimating multiple trains of pulses into substantially a single train and directing beams to specimen gratings affixed to a test material, and a controller, triggering and sequencing the emission of the pulses with the occurrence and recording of a dynamic loading event.

10 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MULTIPLE ACOUSTO-OPTIC Q-SWITCH

CONTRACTUAL ORIGIN OF THE INVENTION

The U.S. Government has rights in this invention pursuant to Contract No. DE-AC07-76ID01570 between the U.S. Department of Energy and EG&G Idaho Inc.

This is a division of application Ser. No. 07/634/625, filed Dec. 27, 1990, now abandoned, which was a division of application Ser. No. 07/418,069, filed Oct. 6, 1989, now U.S. Pat. No. 5,026,154.

BACKGROUND OF THE INVENTION

This invention relates to a method and apparatus for identifying and recording material deformation, fracture, delamination or other response to dynamic stress. More particularly, this invention improves on the methods of dynamic moire interferometry by providing a method and apparatus for directing a rapidly pulsed laser toward a diffraction grating affixed to material which is undergoing stress and simultaneously recording resultant moire interferograms. A basic element in the invention is a unique device combining a ruby laser with ten high-repetition rate q-switches so that ten independently q-switched regions each generate over 100,000 pulses per second. By collimating ten beams and combining them into a pulse train lying on a single axis the invention achieves pulse rates and the recording of interferograms an order of magnitude faster than those achieved in the prior art.

Diffraction moire interferometry uses a reflection-type diffraction grating (i.e. a specimen grating) which is fixed to the object under study and illuminated by at least two mutually coherent collimated beams. If the illuminating beams are set at the proper incidence angles, the plus first diffraction order of one illuminating beam and the minus first diffraction order of the other beam coincide in space along a line normal to the specimen.

As a result, interference fringes (sometimes called moire patterns) representing a contour map of in-plane displacements can be observed. Comparison of fringes before and after loading can be used to determine load-induced displacements.

The technique of moire interferometry has been extended to dynamic moire interferometry, which uses a pulsed laser source. (cf. Deason et al., "Diffraction Moire: The Dynamic Regime," SPIE O-E Lase 87, Los Angeles, January 1987, published by SPIE vol. 746, p. 152) This technique enables the study of dynamic events, effectively freezing stress wave motion and recording its interaction with a material and especially with flaws in a material.

Ruby lasers, which require only approximately 500 nanoseconds to obtain population inversion, are the dominant light source in dynamic interferometry. Pulsing of the output of a ruby laser has long been known in the prior art and pulse rates over 100,000 pulses per second have been achieved. However, none of the prior art pulsed lasers have met the needs in dynamic moire interferometry for an even faster train of high energy pulses with high coherence length.

It is therefore a primary object of this invention to provide a lasing medium coupled with a multiple q-switch which will produce high energy pulses with high coherence length.

In the accomplishment of the foregoing object, it is another important object of this invention to provide a device which will combine said high energy pulses into a single, collimated pulse train.

It is another important object of this invention to provide a moire interferometer which will utilize a high energy pulse train for the generation of diffraction moire interferograms at rates on the order of 1 MHz. It is a further object of this invention to provide a device which will synchronize pulsing of the lasing medium with the occurrence of experimental events, and with the recording of those events in moire interferograms.

Additional objects, advantages and novel features of the invention will become apparent to those skilled in the art upon examination of the following and by practice of the invention.

SUMMARY OF THE INVENTION

To achieve the foregoing and other objects, this invention comprises an improved dynamic moire interferometer used to identify and record surface strain. The improved interferometer is comprised of a lasing medium providing a plurality of beams of coherent light, a multiple q-switch producing multiple trains of 100,000 or more pulses per second, a combining means collimating multiple trains of pulses into substantially a single train and directing beams to specimen gratings affixed to a test material, and a controller, triggering and sequencing the emission of the pulses with the occurrence and recording of a dynamic loading event.

BRIEF DESCRIPTION OF THE DRAWINGS

The present invention is illustrated in the accompanying drawings where.

DETAILED DESCRIPTION OF THE INVENTION

A laser q-switch is a device that prevents lasing action until desired, permitting accurate timing of events associated with the experimental use of the laser, and, with some laser materials, storing larger amounts of energy which can then be dumped into a single giant pulse when the q-switch is activated.

Ruby as a lasing medium exhibits a phenomenon known as spiking with a natural firing rate on the order of 100 kHz. This invention segments a large diameter ruby rod into ten subregions and adds a multiple acoustooptic q-switch having ten independent stations, each controlling a single region of the rod. By firing the regions in sequence, each region can lase at a comfortable rate, while the system as a whole is producing pulses an order of magnitude faster.

Figure 1:
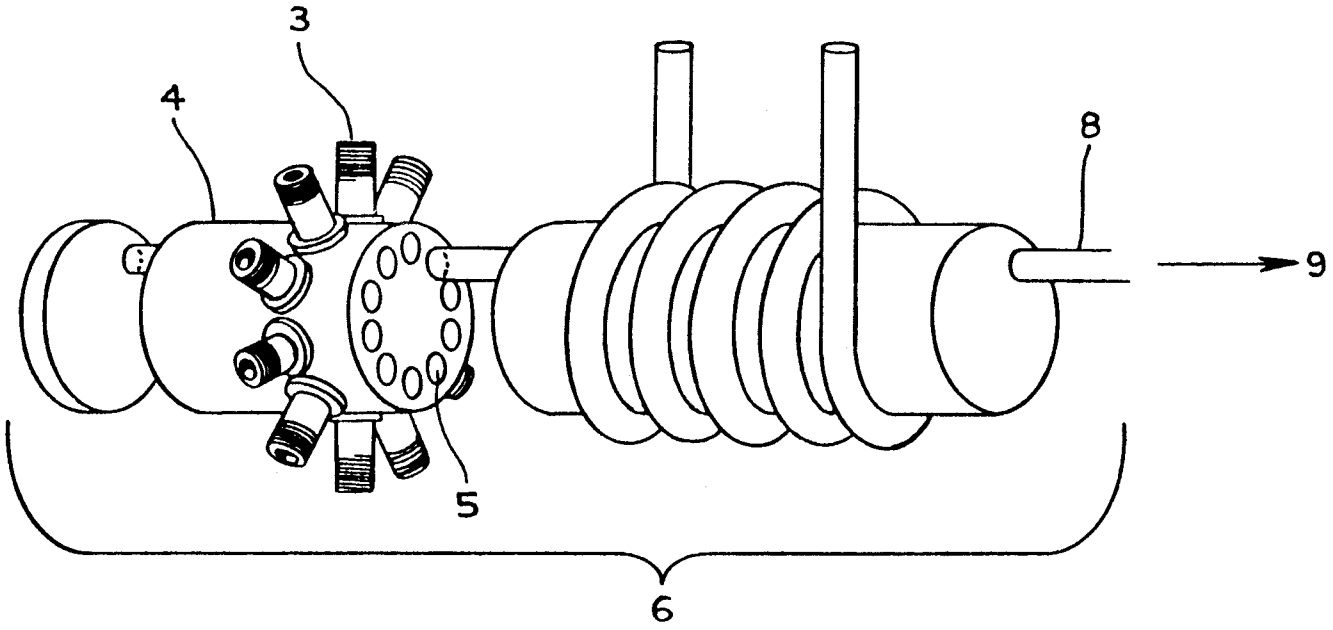
FIG. 1 is a schematic showing the configuration of ten independently activated acousto-optic q-switches with a single ruby laser rod, producing ten pulsed beams on multiple axes.

Referring to FIG. 1, a specially designed Apollo ruby laser 6 having large ¾ inch ruby rods both in the cavity of the oscillator 7 and the amplifier (not shown) has ten lasing subregions. Multiple q-switch 4 adjacent to and along the longitudinal axis of laser 6 is comprised of ten acousto-optic q-switches arranged on the periphery of a circle corresponding to the ten lasing subregions in laser 6.

A driver (not shown) sends two watts of RF power through RF connector 3 to q-switch 5, which prevents laser 6 from lasing in the corresponding subregion. To cause lasing, the RF power to a single q-switch 5 is turned off for a brief time, allowing the laser 6 to pulse in the corresponding subregion, emitting a single laser beam 8 in the direction of arrow 9.

The RF power can be turned off to any single q-switch or to successive q-switches; in the preferred embodiment, the ten q-switches are turned off one after the other in a round-robin fashion. The q-switch pulse interval is adjustable permitting pulsing of a lasing region as frequently as once every seven microseconds, with an individual pulse energy of about 40 mJ and a pulse width of about 20 nanoseconds. As many as 20 or 30 pulses can be produced in a given burst or pulse train from each region, and the rate of pulsing can be controlled by either an adjustable internal clock, or by external pulses synchronized with external events such as camera framing.

A q-switch controller (not shown) contains ten separate two watt RF power supplies operating at 24 mHz. Each supply is separately tuned with its particular acousto-optic q-switch, and the power level is adjusted to yield optimum beam diffraction while the q-switch is on. To remove the 20 watts of power dumped into the q-switch assembly during operation, the assembly is cooled by the same recirculating water stream used to cool the laser flash lamps and the output etalon.

Figure 2:
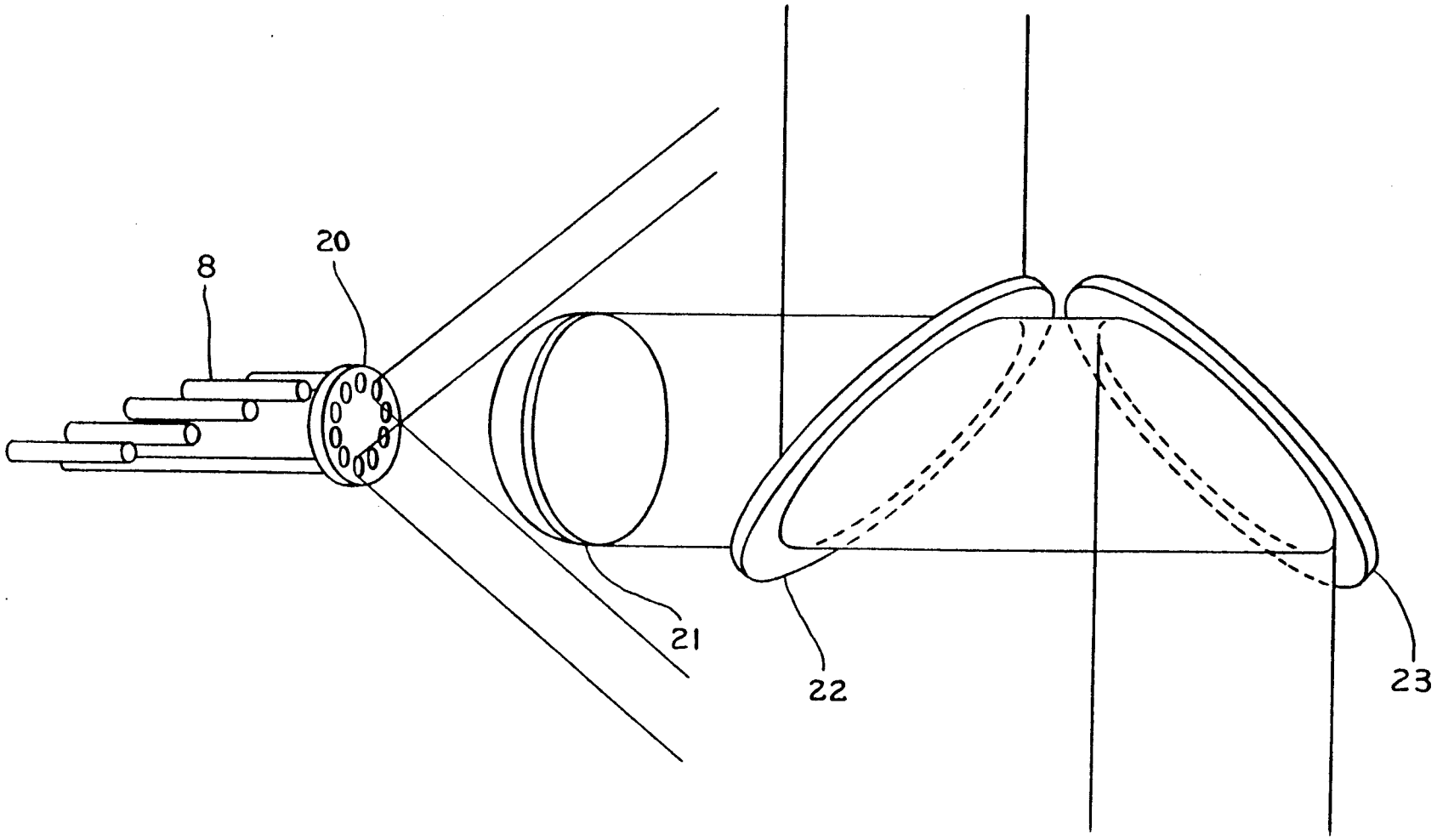
FIG. 2 is a schematic of a device combining and collimating the pulsed beams emitted from the multiple q-switch, and then, using a series of partially and fully reflecting mirrors, splitting and re-combining the resultant single pulse train into two intersecting mutually coherent collimated beams of light.

Referring to FIG. 2, a combining device is comprised of beam expander 20 and collimation lens 21. Beam expander 20 is comprised of ten short focal length negative lenses of focal length f, arranged in a circular array with one lens centered on each beam emerging from laser 6. Collimation lens 21 of focal length F is placed a distance F+f from beam expander 20, in the region of mutual overlap of the ten expanded beams emerging from beam expander 20, and is centered on the beam array. In the current implementation $f=-5$ mm, and $F=250$ mm. Using longer focal length lenses in the system would improve beam quality.

Figure 3:
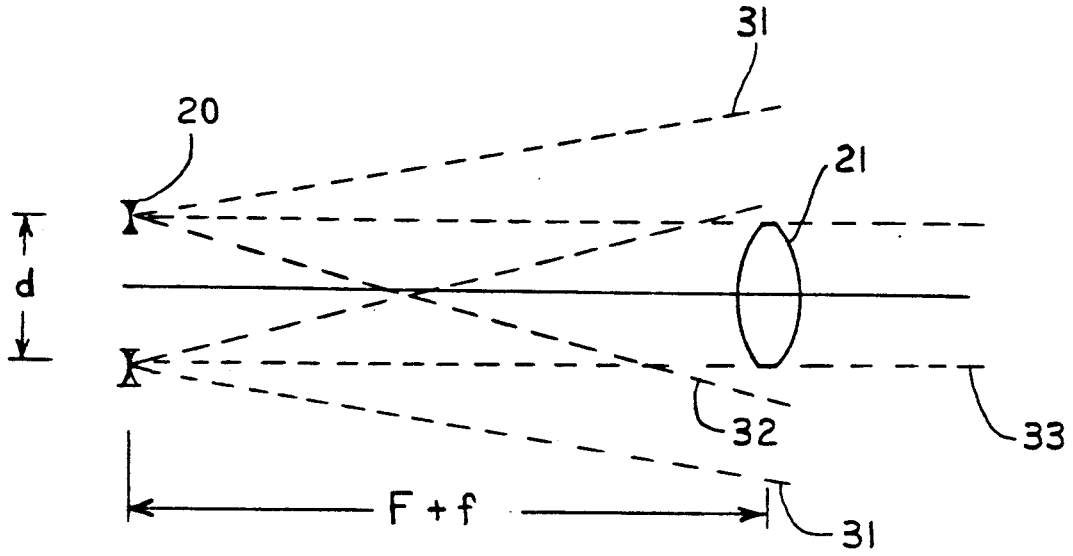
FIG. 3 is a schematic expanding some elements in FIG. 2, depicting the expansion and collimation of multiple pulsed beams into a single pulse train nearly on a single axis.

As detailed in FIG. 3, beams emerging from beam expander 20 over-fill collimation lens 21. The ruby laser beam has a gaussian transverse intensity distribution (the center of the beam 32 is much brighter than the edges), so that truncating the beam using lens 21, excluding the edges 31, provides more uniform intensity in the resultant collimated beam 33. Aberrations due to off-axis usage are reduced to acceptable levels by choosing a collimation lens 21 of focal length $F>>d$, where d is the diameter of the circle on whose circumference the ten beams lie. In the current implementation $d=13.2$ mm.

As a result of collimation in lens 21 the beam array is reduced to a single pulse train nearly on a single axis. This single pulse train is split into two or more mutually coherent beams by splitting means shown in FIG. 2 comprised of partially reflecting mirror 22 and fully reflecting mirror 23, in a manner which is known in the prior art.

Figure 4:
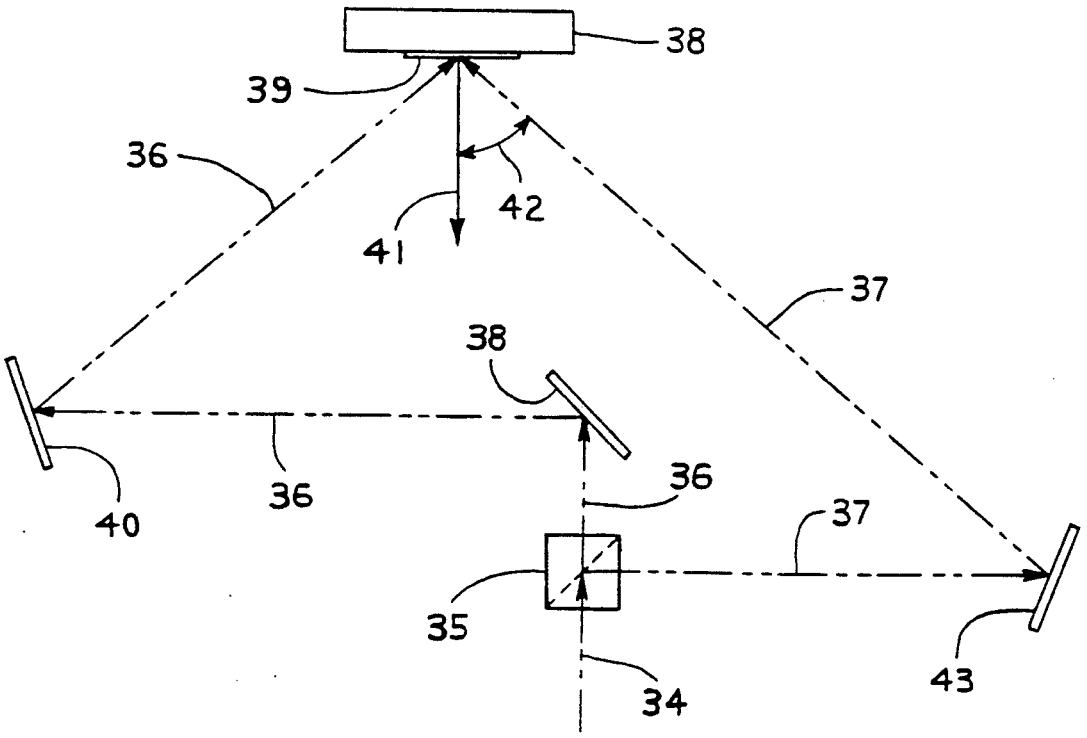
FIG. 4 is a schematic of an alternative means for splitting the single pulse train into two mutually coherent collimated beams—beam splitting cube.

Alternatively, a single pulse train may be split into mutually coherent beams and recombined by means of a beam splitting cube and mirrors as shown in FIG. 4. Collimated laser beam 34 enters beam splitting cube 35 and exits as output beam 36 and output beam 37. Beam 36 is reflected by mirror 38 and mirror 40 and is incident upon grating 39 replicated on specimen 38. Similarly, beam 37 is reflected by mirror 43 and is incident on grating 39. Following the method of moire interferometry, at the critical angle 42 diffraction of incident beams 36 and 37 produces data beam 41.

Figure 5:
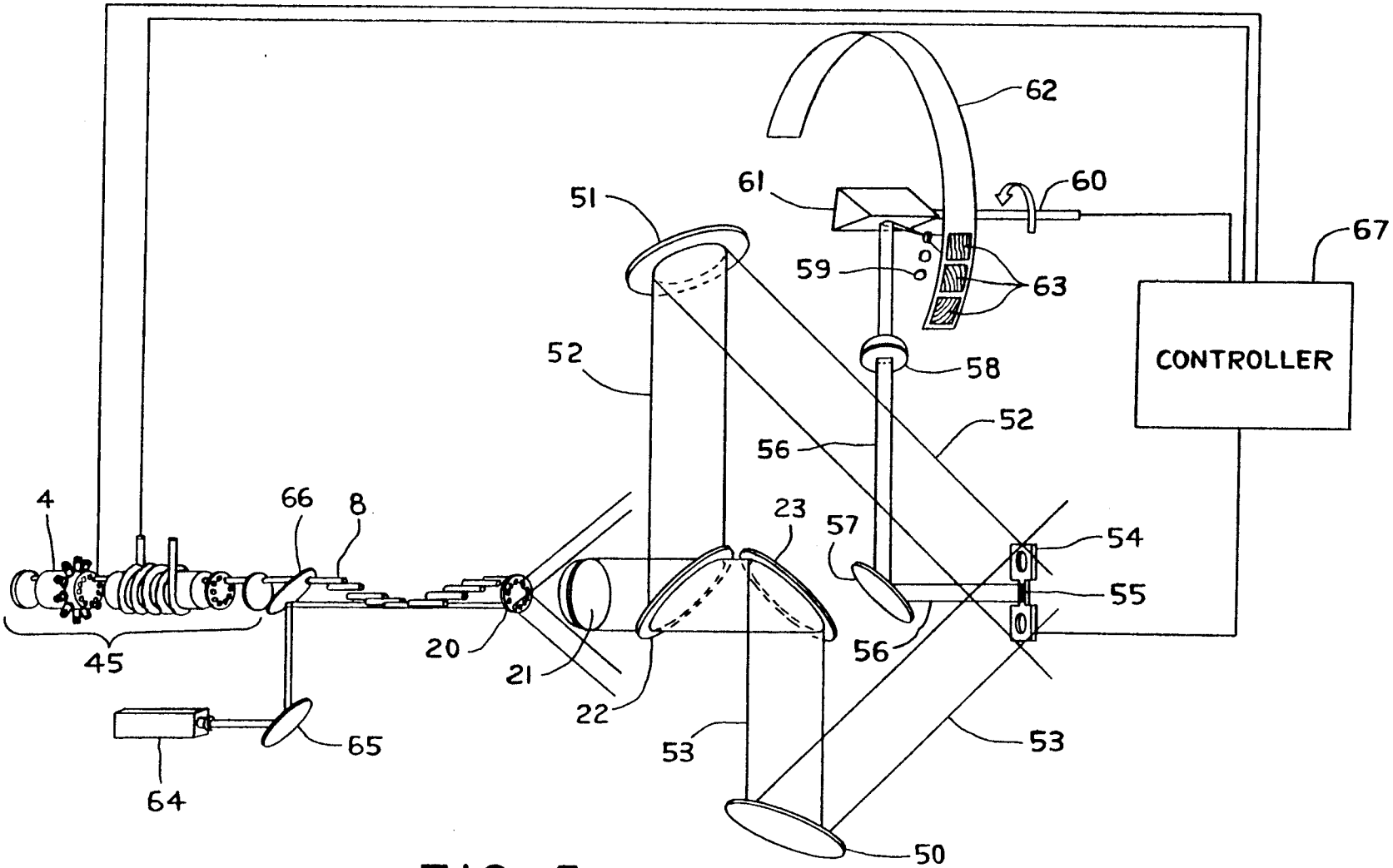
FIG. 5 is a schematic of the preferred embodiment of the present invention, a dynamic moire interferometer incorporating the multi-pulsed ruby laser, the beam combiner and collimator, and a controller synchronizing the occurrence and recording of dynamic events.

FIG. 5 is a schematic of the preferred embodiment of the present invention, a dynamic moire interferometer which includes elements depicted in FIGS. 1 and 2.

Partially reflected beam 52 emerges from partially reflecting mirror 22 and is directed by mirror 51 toward the specimen 54. Beam 53 emerges from mirror 23 and is reflected toward the specimen 54 by mirror 50. Mutually coherent beams 52 and 53 are diffracted by aluminized diffraction grating 55 which is replicated on specimen 54 providing diffracted laser beam 56. Under a load or deformed condition diffracted laser beam 56 carries patterns of constructive and destructive interference which appear on rotating mirror 61 as fringes of bright and dark.

Pulsing of ruby laser 45 using multiple q-switch 4 at a rate in excess of 1 MHz during a loading event provides a time resolved quantitative record of stress wave motion in specimen 54, where each fringe pattern is recorded by a single ruby pulse, 20 nanoseconds long, thus "freezing" the high speed event. These fringes or moire patterns are recorded for later observation by means of an ultra-high speed camera the major elements of which are lens 58, turbine 60, imaging element 59, rotating mirror 61, and film 62. Diffracted laser beam 56 is directed toward rotating mirror 61 by mirror 57 and lens 58. Turbine 60 spins rotating mirror 61 at 8,000 rps, reflecting moire patterns through imaging elements 59 to film 62, capturing up to 2,000,000 images per second as interferograms 63. In the preferred embodiment, recording is accomplished using a Cordin Model 330-A high speed framing camera using Kodak High Speed Infrared film.

The dynamic moire interferometer depicted in FIG. 4 has several subsystems which must be brought into synchronization during operation: the flashlamp power supply and firing circuits of laser 45; speed control of turbine 60; pulsing circuits of q-switch 4; and the application of stress to specimen 54. Certain of these systems have their own constraints. For example, the Cordin camera requires at least 10 seconds to come up to speed, can stay at speed for no more than 60 seconds and must then remain off for at least 10 times the operating time (to allow lubricants to be redistributed and for components to cool). Also, flashlamp power supply once energized will automatically dump its charge if laser 45 is not fired within 60 seconds, and once the flash lamps are fired, the ruby rods require several hundred microseconds to store sufficient energy to lase. Thus, most dynamic moire experiments will consist of the following events: (1) start camera turbine; (2) when camera is at speed, charge laser capacitor banks; (3) when laser is ready to fire, begin application of stress, for example, operate a piston driven impactor or activate a drop tower; (4) prior to impact of stress on specimen, activate a delay circuit; (5) at predetermined delay, fire laser flashlamps; (6) after impact, during dynamic event, send out a gating pulse to the q-switch controller allowing the frame sync pulses from the camera to pass and cause the q-switch to operate; and (7) fire on all ten regions in sequence, each laser pulse in synchronization with the frame alignment pulses of the camera, until the sync pulse train is terminated or the lasing media is no longer capable of providing gain.

In the preferred embodiment, synchronization of these events is accomplished by controller 67 consisting of delay and pulse shaping components. Some of the interferometer's subsystems require TTL level trigger pulses, often with 50 ohm terminations, while others require 10 volt pulses with particular rise times, durations and current capabilities. To accommodate such disparate requirements, a central control unit provides the capability to accept various types of input signals and to convert these to a variety of output signals. Means are provided to isolate these circuits from electric noise generated when the ruby laser flash lamp circuits fire.

Due to the rapidity of the ruby laser pulse rate and to the inherent danger to an operator's eyes, it is virtually impossible to align a ruby system rapidly and accurately using ruby pulses alone. As is known in the prior art, alignment is accomplished using a continuous laser beam, usually HeNe with a wavelength only 10% shorter than that of the ruby. The HeNe and ruby beams are collinear and pass through the external optics at the same locations. In the preferred embodiment, a single 10 mW HeNe laser 64 shown in FIG. 5 is used and its beam is combined with the beam emerging at top dead center of laser 45 by means of mirror 65 and partial mirror 66.

When the combined ruby and HeNe beams strike grating 55 they are diffracted at different angles. Using a conventional single frequency diffraction grating and aligning with an HeNe laser, the ruby data will contain about 240 lines per mm of misalignment fringes, which is beyond the resolution of most films. Therefore, the preferred embodiment uses a dual frequency diffraction grating. A region of grating is created either along the edge of the specimen grating 55 or over its entire surface which differs in lines per mm and can be used for alignment. On a grating which has 1080 lines per mm and can be used for taking data, this alignment region will have a groove frequency of 1200 lines per mm.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. It is intended that the scope of the invention be defined by the claims appended hereto.

The embodiments of this invention in which an exclusive property or privilege is claimed are defined as follows:

1. A laser emitting laser pulses on multiple axes, comprising:

a lasing medium having a plurality of lasing subregions, a multiple q-switch located adjacent to and along the longitudinal axis of said lasing medium, comprised of a plurality of q-switches independently switching each of said subregions.

2. A multiple q-switch for pulsing a plurality of independent laser beams from a single lasing medium, comprising:

a plurality of acousto-optic q-switches arranged on the periphery of a circle corresponding to a plurality of lasing regions in said laser, where a specific q-switch corresponds to a specific lasing region, and means for turning off RF power to any of said acousto-optic switches where said loss of RF power allows said specific lasing region to pulse.

3. The apparatus of claim 2 including means for turning off RF power to successive q-switches.

4. The apparatus of claim 3 wherein turning off RF power to successive q-switches pulses successive independent beams from said lasing regions in the MHz range.

5. The apparatus of claim 3 including means for adjusting the interval between turning off RF to successive q-switches.

6. The apparatus of claim 5 where the means for adjusting the interval between turning off RF to successive q-switches is an adjustable internal clock.

7. The apparatus of claim 5 wherein said means for adjusting the interval between turning off RF to successive q-switches is synchronized with external events.

8. The apparatus of claim 3 wherein the q-switches are cycled off and on in an ordered sequence where said ordered sequence moves from one lasing region to an adjacent lasing region while maintaining a specific direction around the periphery of said circle, thus, allowing the pulsed regions to re-pump before the next pulse for that region is activated.

9. The apparatus of claim 2 where a q-switch controller supplies separately tuned RF power to each acousto-optic q-switch.

10. The apparatus of claim 9 where said RF power supplied to a specific q-switch is adjusted to provide optimum beam diffraction.

* * * * *